United States Patent [19]

Ni

[11] Patent Number: 5,603,855
[45] Date of Patent: Feb. 18, 1997

[54] CONTINUOUS WELDING DEVICE WITH LINEAR DRIVE

[76] Inventor: Chong Y. Ni, 75 Springbrook Dr., Richmond Hill, Ontario, Canada, L4B 3R3

[21] Appl. No.: 585,701

[22] Filed: Jan. 16, 1996

[51] Int. Cl.⁶ .................................................. B23K 9/133
[52] U.S. Cl. ........................ 219/137.31; 219/137.61
[58] Field of Search ........................... 219/137.31, 136, 219/137.2, 137.61, 137.7, 145.23, 145.31

[56] References Cited

U.S. PATENT DOCUMENTS 2,019,970  11/1935  Hopkins ........................... 219/145.23
2,133,970  10/1938  Christensen et al. ............. 219/145.31
4,954,690   9/1990  Kensrue ........................... 219/137.31

Primary Examiner—Clifford C. Shaw
Attorney, Agent, or Firm—David W. Wong

[57] ABSTRACT

A linear drive is provided within this welding device for out a welding operation with an elongated welding electrode. The device advances the electrode towards the welding area as well as for providing the welding current with high efficiency to the welding electrode for the welding operation. The linear drive is provided by a plurality of current conducting elements circulated between two parallel tracks. The elements directly engage with a drive gear mechanism provided within the device, and they also have contact fingers engage with the metal core of the electrode exposed in a plurality of slots formed in the welding flux coating provided on the electrode.

9 Claims, 2 Drawing Sheets

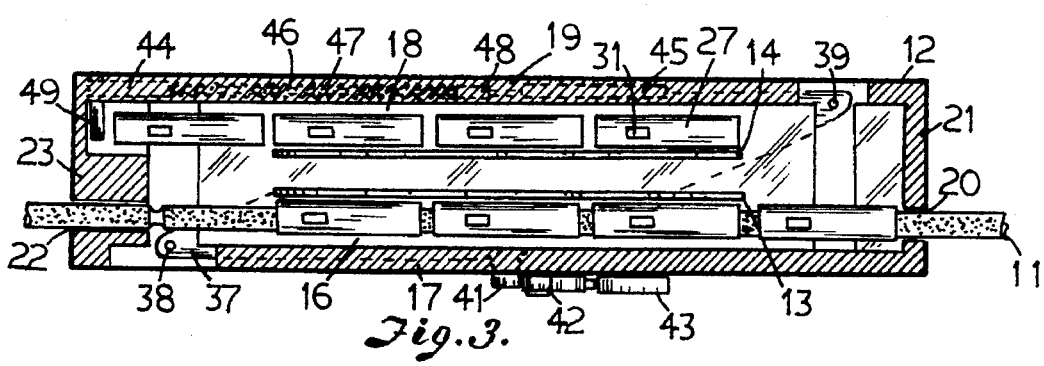
Fig. 3.
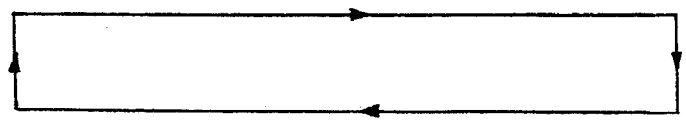
Fig. 4.
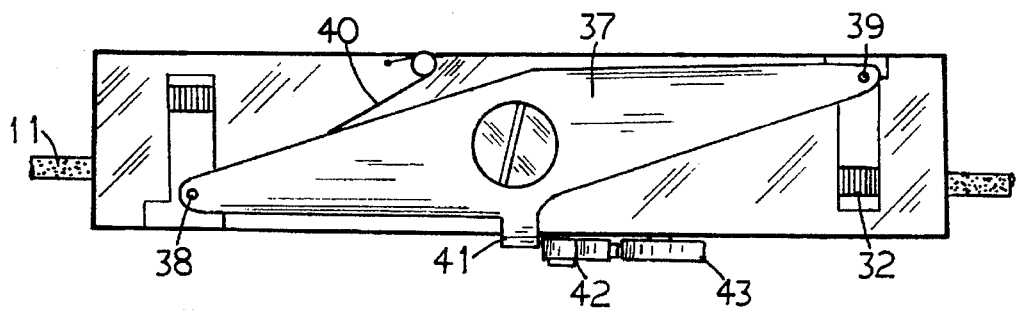
Fig. 5.
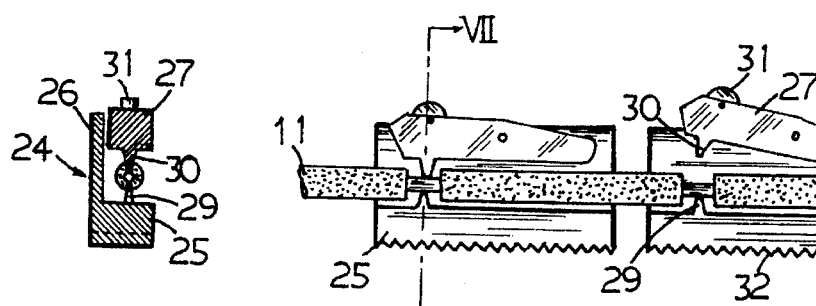
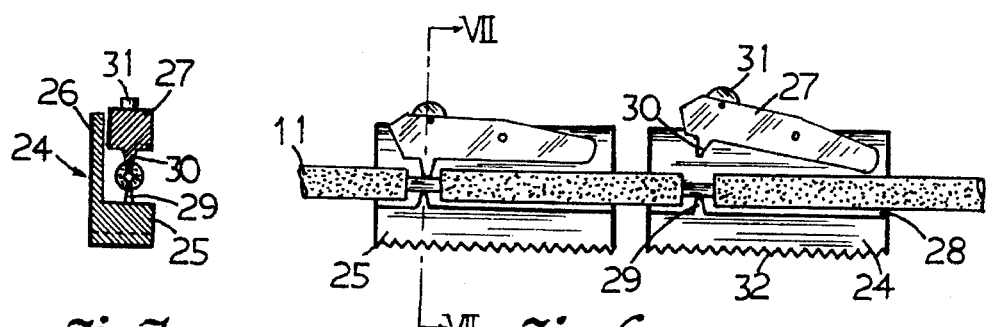
Fig. 7.    Fig. 6.

5,603,855

CONTINUOUS WELDING DEVICE WITH LINEAR DRIVE

BACKGROUND FOR THE INVENTION

This invention relates to a welding device for carrying out a continuous welding operation, and more particularly relates to a welding device for use with an elongated welding electrode having a welding flux coating provided thereon. The flux coating has a plurality of gaps formed at even intervals along its entire length to expose the metal core within the electrode.

A continuous welding operation may be carried out with an elongated welding electrode having a welding flux coating provided thereon. As shown in Applicant's copending continuation-in-part application No. 08/427,408, filed on Apr. 24, 1995, now pending, a plurality of slots or gaps may be provided at equal intervals in the flux coating such that the welding current may be applied to the metal core of the electrode through these gaps to provide a high current required for the welding operation. In order to carry out the welding operation, the welding electrode may be driven through a welding device by a plurality of contact carriers mounted on one or two drive chains. The contact carriers not only apply the high welding current to the plurality of contact points in the metal core defined by the gaps in the flux coating but also engage these gaps for advancing the electrode continuously towards the welding area. Such a welding device is shown in Applicant's copending application No. 08/343,021, filed on Sep. 12, 1994, now U.S. Pat. No. 5,448,217. Although such chain driven welding device is efficient in providing the welding operation, it has several drawbacks. Firstly, in order for the contact element to move freely by the drive chain movably mounted on a rotary wheel located at the front end of the housing of the welding device, a relatively large area in the housing must be provided to accommodate at least the radius of the rotary drive wheel plus the width of the drive chain plus the width of the contact element. The total width of these elements invariably increases the effective distance between the front end of the welding electrode to the current contact point closest to this front end. Thus, the current must pass through a relatively long length of electrode between these two points to the welding area, and it reduces the efficiency of the welding current due to the resistance loss passing through such relatively long length of the electrode. Typically, for a chain driven welding device using a common welding electrode of 2.0 mm in diameter and having a plurality of contact slots formed 38.1 mm apart from one another in the flux coating, the minimum distance between the welding area to the closest current contact point is at least 10 cm long, and the effective welding current obtained at the welding area is often less than 200 A which is not sufficient for producing a high quality weld. Furthermore, the welding device, particularly for a double drive chain device, must have an even larger size then the above in order to house the drive chains, their rotary drive wheels and the driving mechanism as well as to provide the space for the contact elements to be circulated within its housing. For this reason, the chain driven welding devices are rather bulky in size and heavy in weight and they are not conducive for handheld application due to the difficulty in having to manoeuvre such large size and heavy weight.

Another drawback of the chain driven welding devices is that the drive chains, after even a short period of use, tend to become slacken due to wear. The slack in turn causes the contact elements mounted thereon to become misaligned with the welding electrode such that the latter may become jammed in the device, or the flux coating on the electrode is torn by the misaligned contact elements. Also, a poor contact engagement may result between the contact fingers of the contact elements and the metal core of the welding electrode. The poor contact not only reduces the effective amount of welding current provided to the welding area and seriously affecting the quality of the weld and it also inherently generates harmful heat at the contact points. Such undesirable heat accelerates the deterioration of the contacts and it may also raise the body temperature of the welding device housing to an unmanageable degree for handheld operation.

SUMMARY OF THE INVENTION

It is a principal object of the present invention to provide a welding device having a linear drive mechanism for its current contact elements.

It is another object of the present invention to provide a welding device having a minimum distance between the welding area and the closest welding current contact point.

It is another object of the present invention to provide a welding device having very little wear in its electrode drive mechanism It is a further object of the present invention to provide a welding device in which the contact fingers of the contact elements engage positively with the metal core of the welding electrode to eliminate heat generation at the contact point.

It is yet another object of the present invention to provide a welding device having a relatively small size and is suitable for handheld application.

Primarily, the welding device comprises a plurality of current contact elements slidably mounted in two parallel channels within the housing therein. The contact elements are circulated between these two channels by a direct drive mechanism operated by a speed control means. The contact elements have a longitudinal slot provided therein defined by a spring mounted pivotable contact finger and a fixed contact finger provided on its side wall opposite to the pivotable contact finger. The slot is operative for accommodating a welding electrode to pass therethrough in the welding device. The pivotable contact finger is operative to conduct a welding current to contact points in the metal core of the welding electrode along its entire length and is also operative to advance the electrode forward through the device to the welding area.

BRIEF DESCRIPTION OF THE DRAWINGS

FIG. 3 is a partial cross sectional top elevation view of the housing thereof along section line III—III in FIG. 1, showing the contact elements located in the two channels therein.

FIG. 4 is a schematic diagram of the circulation path of the contact elements between the two channels therein.

FIG. 5 is an isolated partial bottom view of the housing showing the rocker member therein for moving the contact elements from one channel to the other.

FIG. 6 is an enlarged isolated side elevation view of the contact elements and the welding electrode extending therethrough.

FIG. 7 is a cross sectional front elevation view along cross section line VII—VII in FIG. 6.

DESCRIPTION OF THE PREFERRED EMBODIMENTS

Figure 1:
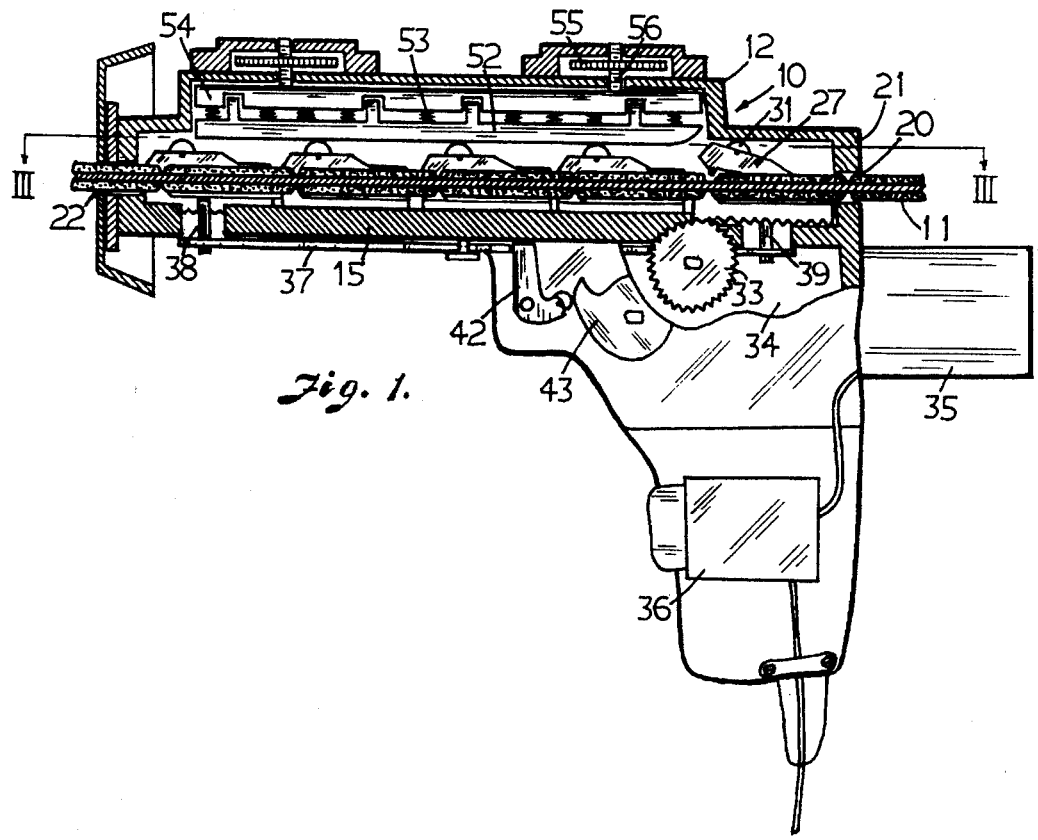
FIG. 1 is a partial cross sectional side elevation view of the welding device with according to the present invention with portions of the housing removed to show the drive mechanism therein.

With reference to the drawings in which like reference numerals designate like parts in the several views therein, the welding device 10 is for use with an elongated welding electrode 11 which has a welding flux coating provided on its surface and a plurality of slots are formed in regular even interval along its length to expose the inner welding metal core. Such welding electrode is shown in Applicant's U.S. CIP patent application No. 08/427,408 filed Apr. 24, 1995. The slots provide multi-contact points to facilitate a large welding current to be applied with high efficiency through these slots to the metal core for carrying out high quality welding operations. Furthermore, the slots also provides the means cooperating with the driving mechanism in a welding device to advance the welding electrode continuously towards the welding area. The welding device 10 has an overall generally rectangular main body housing 12. As best shown in Fig. 3, the interior of the housing 12 has two parallel longitudinal channels provided by two parallel ridges 13 and 14 formed on the bottom panel 15 of the housing 12. An advance channel 16 is defined between the left side wall 17 of the housing, and a return channel 18 is defined between the ridge 14 and the right side wall 19 of the housing 12. An inlet opening is provided at the rear wall 21 of the housing to admit the welding electrode 11 into the welding device, and the welding electrode 11 exits the welding device through an outlet opening 22 provided at its front wall 23. The inlet opening 20 and outlet opening 22 are aligned with the advance channel 16.

A plurality of generally rectangular contact carriers 24 are slidably located in the advance channel 16 and return channel 18. The contact carriers 24 have the same length which is equal to the distance between the slots formed on the welding electrode 11. The longitudinal length of the ridges 13 and 14 is one contact carrier length shorter than the overall inside length of the housing 12 in both the front and the rear such that a contact carrier 24 reaching the front end of the advance channel 16 beyond the front end of the ridge 13 may move sideways to the return channel 18, and similarly a contact carrier 24 in the return channel 18 after reaching the rear end of the return channel 18 beyond the end of the ridge 14 may move sideways to the advance channel 13. Thus, the contact carriers 24 move through a continuous linear path between the advance channel 13 and return channel 18 in the housing 12 as shown in FIG. 4.

Each contact carrier 24 has a generally and cross sectionally L-shaped body including a base portion 25 and a right upright wall 26 as best shown in FIGS. 6 and 7. A movable contact arm 27 is pivotally mounted on the upright wall 26 such that a longitudinal gap 28 is provided between the lower surface of the contact arm 27 and the base portion 25. The longitudinal gaps 28 of the contact carriers 24 located in the advance channel 16 cooperate to form an elongated channel for the portion of the welding electrode extending between the front end 23 and rear end 21 of the housing 12. A lower contact finger 29 is formed at the base portion 25 of the contact carrier 24 and an upper contact finger 30 is formed at the bottom of the pivotable contact arm 27. The lower contact finger 29 and upper contact finger 30 are cooperative to grip the welding electrode 11 at the contact slots and to come in contact with the metal core in the welding electrode for supplying the welding current thereto as well as for moving the welding electrode 11 forwards towards in the welding device. The pivotal contact arm 27 is spring-biassed such that the upper contact finger 30 is normally pivoted away from the lower contact finger 29. A contact wheel 31 or alternatively a contact spring is mounted on the contact arm 27. Driving teeth 32 are formed at the bottom of the contact carriers 24 such that a contact carrier located at the rear end of the advance channel 13 may be driven to slide forward by engaging with a drive gear 33 located in a driving mechanism housing 34 located below the rear portion of the housing 12. The drive gear 33 extends from the driving mechanism housing 34 into the housing 12 through a slot formed in the bottom of the housing 12. Since the contact carriers 24 are abutting each other in the advance channel 13, the movement of the contact carrier 24 at the rear of the channel automatically pushes all the contact carriers 24 to move forwards lineally towards the front end 23 of the housing. The drive gear 33 is operated through a mechanical linkage to a motor 35 and a speed control 36 mounted to the welding device.

As best shown in FIG. 5 the movement of the contact carrier 24 between the advance channel 16 and the return channel 18 is effected by a rocker arm 37 pivotally mounted at the bottom of the housing 12. A front push rod 38 mounted at the front end of the rocker arm 37 extends upwards into the housing 12 juxtaposed to the left side wall 17. A rear push rod 39 mounted at the rear end of the rocker arm 37 extends upwards into the housing 12 and located juxtaposed to the right side wall 19 of the housing. The rocker arm 37 is normally biassed by a spring 40 mounted at the bottom of the housing 12. The rocker arm 37 has an extension side arm 41 which may be pushed by an L-shaped arm 42 spring-mounted on the driving mechanism housing 34. The L-shaped arm is operative by a cam 43 coupled to the driving mechanism. The cam 43 is operative when a contact carrier reaches the front position in the advance channel while simultaneously a contact carrier also reaches the rear end of the return channel to push the extension side 41 such that the front push rod 38 is pivoted to push the front contact carrier in the advance channel to move lineally sideways to the return channel while simultaneously the rear push rod 39 is pivoted to push the rear contact carrier in the return channel to move lineally sideways to the advance channel.

After the contact carrier moved from the advance channel to the return channel, it is pushed rearwards lineally by a sliding mechanism as shown in ghost image in FIG. 3 mounted in an elongated slot formed in the right side wall 19 of the housing 12. The sliding mechanism consists of a slider 44 coupled to a pulling member 45 by an elongated sliding rod 46. The slider 44 is biassed by a compression spring 47 surrounding the sliding rod 46 and located between the slider 44 and an abutment 48, such that the compression spring 47 normally maintains the slider 44 to locate at the front end of the housing 12. A transverse pin 49 is mounted at the front end of the slider 44 and it extends sideways into the front end of the return channel 18 to locate in front of the contact carrier 24 which has been pushed by the push rod 38 to this position from the advance channel 16. The pulling member 45 has a plurality of driving gears provided at its bottom which are operative to engage with a fan-shaped gear wheel 50 located at the side of the driving mechanism housing 34. The gear wheel 50 will be operated by the control mechanism such that its drive gears 51 formed on a portion of its periphery will engage the driving gears at the bottom of the pulling member 45 when a contact carrier 24 has moved into the front position of the return channel 18 so that the slider 46 will be pulled by the pulling member 45 to move backwards towards the rear of the return channel 18 against the biassing force of the compression spring 47. This action causes the transverse pin 49 to push the contact carrier 24 located at the front end of the return channel 18 to move backwards towards the rear end therein. As soon as the contact carrier 24 has been pushed one contact carrier position backwards, the bottom teeth of the pulling member 45 will disengage from the fan-shaped gear wheel 50 so that the biassing force of the compression spring 47 acting on the slider 46 will cause the slider 47 to move back to the position at the front of the return channel 18 awaiting for the arrival of the next contact carrier to move into the front position of the return channel 18. Due to the chain reaction of the contact carriers located in the return channel 18, the backward movement of the front contact carrier to the next contact carrier position will cause the last contact carrier to move into the end position of the return channel 18 at the same time as a contact carrier moves to the front position in the advance channel 16. At this moment the rocker arm 37 will be operated by the cam 43 and L-shaped arm 42 to pivot such that the contact carrier moving to the front position of the advance channel 16 will be pushed by the front push rod 38 to move into the front position of the return channel 18, simultaneously the contact carrier at the rear end of the return channel 18 will be pushed by the rear push rod 39 to move into the rear position of the advance channel 16. In this manner, the contact carriers are lineally circulated between the advance channel 16 and the return channel 18.

Figure 2:
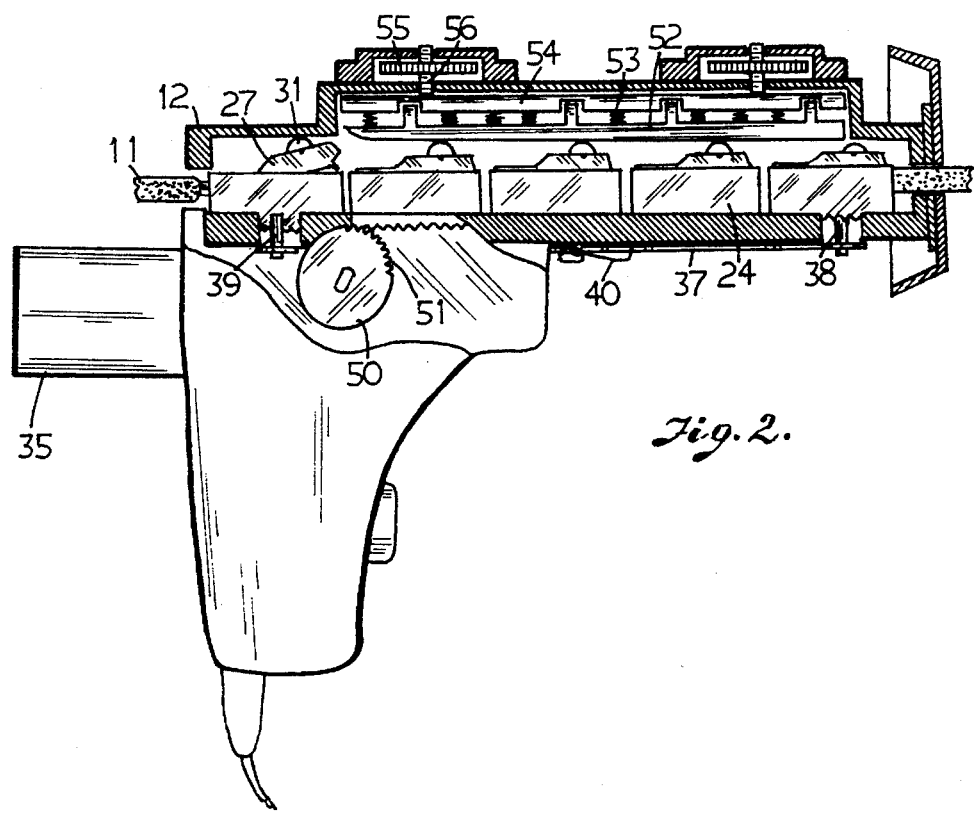
FIG. 2 is a partial cross sectional side elevation view of the opposite side thereof.

When a contact carrier 24 moving from the rear position in the advance channel 16 into the next position, its contact wheel 31 slidably engages with an elongated contact bar 52 positioned over the advance channel 16 such that the downward pressure of the contact bar 52 maintains the pivotal contact arm 27 of the contact carriers in the advance channel 16 to press downwards so that the contact fingers 29 and 30 cooperate to grip the welding electrode 11 at its exposed gaps for advancing the latter forward in the advance channel 16 as well as to provide a tight contact pressure between the contact fingers and the metal core of the electrode. Thus, the welding current can be supplied to the metal core of the electrode with a high efficiency. The downward pressure of the contact bar 52 is maintained by a plurality of compression springs provided between the contact bar 52 and pressure cap 54 slidably located in the housing 12 as best shown in FIGS. 1 and 2. The downward pressure may additionally be adjusted by the adjustment wheels 55 mounted over the housing 12. The adjustment wheels 55 have lower plungers 56 extending into the housing 12 to engage the pressure cap 54. The plungers 56 may be adjusted upwards or downwards by operating the adjustment wheels 55 so as to change the downward pressure of the contact bar 52 pressing against the pivotal contact arm 31 of the contact carriers located in the advance channel 16. Such adjustment may be necessary to compensate for any physical variations in the welding electrode.

As best shown in FIG. 1, only a very short distance exists between the contact point of the contact carrier located at the front end of the advance channel 16 to the welding area located immediately to the front of the welding device, thus there is virtually no loss of welding current passing through the welding electrode. Accordingly, a high welding efficiency can be achieved.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of the invention.

I claimed:

1. A welding device comprising a housing having an elongated advance channel located therein adapted to receive an elongated welding electrode to pass therethrough from an inlet opening located at the rear end of said housing to an outlet opening located at the front end of said housing, said welding electrode having a plurality of substantially equal length sections of welding flux coated thereon and slots being provided between said sections of welding flux to expose predetermined portions of a metal core in said welding electrode, an elongated return channel located in said housing, and said return channel being generally parallel to said advance channel, a plurality of contact carrier members located in said advance channel and return channel, each contact carrier member having a longitudinal gap therein operative to receive said welding electrode from extending through said housing, said contact carrier members having a length substantially equal to the length of said sections of welding flux coated on said welding electrode, and said advance channel and return channel each having a space provided therein substantially equal to the longitudinal length of one contact carrier member, said space being operative to receive a contact carrier member to move sideways in said housing from one channel to the other between said advance channel and return channel.

2. A welding device according to claim 1 including an electric motor member and a drive gear mechanism provided in said welding device, said drive gear mechanism being coupled to said motor member and to at least a last contact carrier member located at the rear of said advance channel, said motor member being operative to rotate said drive gear mechanism for moving said last contact carrier member towards the front of said advance channel.

3. A welding device according to claim 2 wherein said longitudinal gap in said contact carrier member is located on one side therein, said gap being formed between an upper surface of a base portion and a lower surface of a movable arm pivotally mounted to the upper portion of said one side.

4. A welding device according to claim 3 including a first contact finger member provided on said lower surface of said movable arm and extending downwards therefrom, and a second contact finger member provided on said upper surface of said base portion and extending upwards therefrom, said first contact finger member and second contact finger member being operative cooperatively to engage with one of said slots in said welding flux to grip said welding electrode firmly and to form intimate electrical contacts with said metal core.

5. A welding device according to claim 4 including a control member mounted in a handle portion located below said housing, said control member being electrically connected to a power source and to said motor member and being operative to move selectively said last contact carrier member forwards towards the front end of said housing and in turn moving all contact carrier members located in said advance channel forwards thereby.

6. A welding device according to claim 5 including a rocker member pivotally mounted below said housing, said rocker member being operative to move a front contact carrier member located at the front end portion of said advance channel slidably and lineally sideways into said space in said return channel, and simultaneously to move a rear contact carrier member located at the rear end portion of said return channel slidably and lineally sideways into said space in said advance channel.

7. A welding device according to claim 6 including a cam member and an L-shaped pivotal arm mounted on said housing, said cam member being coupled to said drive gear mechanism and operative thereby to pivot said rocker member through said L-shaped pivotal arm when said front contact carrier member moves to said front end portion of said advance channel and simultaneously said rear contact carrier member also moves to the rear end portion of said return channel.

8. A welding device according to claim 7 including a slider member slidably mounted in an elongated slot formed at one side of said housing, and a pulling member also slidably mounted in said elongated slot, said slider member and said pulling member being connected to one another, a fan-shaped drive gear member coupled to said drive gear mechanism and to said pulling member and being operative to move a return contact carrier member in said return channel rearwardly in said housing after said return contact carrier member has moved from said advance channel to said return channel.

9. A welding device according to claim 8 including a biassing compression spring member mounted between said slider member and an abutment located in said elongated slot, said compression spring member being operative to maintain said slider member located at the front end of said return channel.

* * * * *